No. 686,239. Patented Nov. 5, 1901.
I. M. WARNER.
WIRE TIGHTENER.
(Application filed Jan. 21, 1901.)
(No Model.)
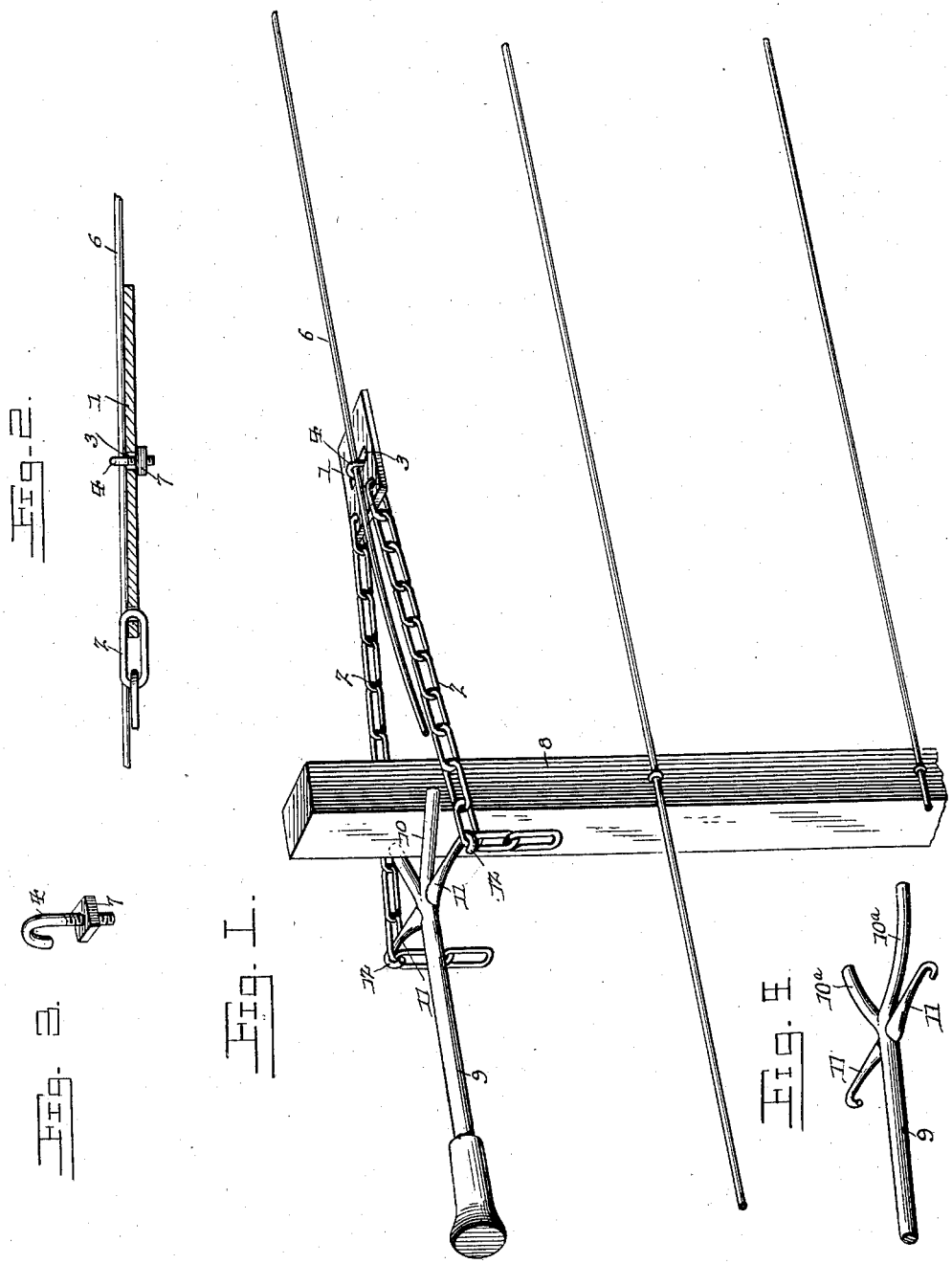
Witnesses
F. E. Alden.
J. F. Riley
I. M. Warner, Inventor.
by C. A. Snow & Co.
Attorneys
THE NORRIS PETERS CO., PHOTO-LITHO., WASHINGTON, D. C.

UNITED STATES PATENT OFFICE.

ISAAC M. WARNER, OF UNION CITY, MICHIGAN, ASSIGNOR TO FRANK C. BOISE, OF UNION CITY, MICHIGAN.

WIRE-TIGHTENER.

SPECIFICATION forming part of Letters Patent No. 686,239, dated November 5, 1901.

Application filed January 21, 1901. Serial No. 44,126. (No model.)

*To all whom it may concern:*

Be it known that I, ISAAC M. WARNER, a citizen of the United States, residing at Union City, in the county of Branch and State of Michigan, have invented a new and useful Wire-Tightener, of which the following is a specification.

The invention relates to improvements in wire-tighteners.

The object of the present invention is to improve the construction of wire-tighteners and to provide a simple, inexpensive, and efficient one which will possess great strength and durability and which will be capable of readily stretching a fence-wire to the desired tension and of holding the same while it is being stapled or otherwise secured to a fence-post.

The invention consists in the construction and novel combination and arrangement of parts hereinafter fully described, illustrated in the accompanying drawings, and pointed out in the claim hereto appended.

In the drawings, Figure 1 is a perspective view of a wire-stretcher constructed in accordance with this invention and shown applied to a fence-post. Fig. 2 is a detail sectional view illustrating the construction of the wire-engaging device. Fig. 3 is a detail view of the hook-bolt. Fig. 4 is a detail view showing curved prongs.

Like numerals of reference designate corresponding parts in all the figures of the drawings.

1 designates a wire-engaging device connected to the outer ends of a pair of chains 2 and consisting of a flat rectangular plate provided with an opening or slot 3, receiving a hook-bolt 4, which clamps a wire to the plate, as clearly illustrated in Figs. 1 and 2. The hook-bolt which engages the fence-wire 6 is provided with a nut 7, and it receives the wire within its hook. The wire is arranged at one of the faces of the rectangular plate, and the nut engages the opposite face of the plate, as clearly shown in Fig. 2. The slot extends transversely of the plate, and the wire is tightly clamped and may be slightly drawn into the slot or opening. The nut of the hook-bolt may be turned by means of a wrench or any other suitable tool, and after the wire is clamped on the plate it is securely held and prevented from accidentally slipping.

The chains 2, which are composed of open links, are designed to extend across the opposite faces of a fence-post 8, and the said links are adapted to be engaged by an operating-lever 9, having a fork or bifurcation to receive the fence-post and adapted to be fulcrumed thereon. The fork 10, which is arranged at one end of the lever 9, is preferably composed of two similar sides arranged at an acute angle to each other and forming a crotch to receive the fence-post. The lever 9 is adapted to be oscillated horizontally for a purpose hereinafter described, and it is capable of being fulcrumed on a rectangular, round, or other shaped fence-post. The lever is provided with laterally-extending arms 11, located immediately in rear of the fork 10 and provided at their outer ends with hooks 12, adapted to receive and engage the links of the chains 2, as clearly illustrated in Fig. 1 of the accompanying drawings. The lever is adapted to be swung horizontally to carry one of the arms 11 and the chain, which is connected with the said arm, rearwardly to stretch the fence-wire, and the other arm 11 moves forwardly a distance corresponding with the rearward movement of the said arm. The chain which is connected with the forwardly-projected arm is thereby slackened, and the said arm is adapted to be hooked into a link in advance of that previously engaged by it, whereby the chain, or that portion of the chain extending from the forwardly-projecting arm to the wire-engaging device, is shortened. The operating-lever is then swung horizontally in the opposite direction, and the laterally-extending arm, which was projected forwardly by the previous operation of the lever, will now be carried rearwardly, and the other arm is projected forwardly to enable the chain connected with the same to be shortened. By this construction the lever operates in the nature of a ratchet, and the chains are gradually shortened until the wire-engaging device is drawn toward the post the desired distance to secure the necessary tension of the fence-wire. After the wire has been stretched to the desired tension it is stapled or otherwise secured to the fence-post, and it is held during the operation of securing it to the post by means of the wire-tightener. The tension of the parts of the wire-tightener holds the lever firmly in engagement with the fence-post, and there is no liability of the lever accidentally slipping while the fence-wire is being fastened. After the fence-wire has been secured the nut of the hook-bolt is unscrewed, and the wire-engaging device is removed from the fence-wire which has just been stretched and is ready for engagement with another fence-wire. The outer end of the oscillatory lever is provided with a suitable grip or handle, and the said lever may be readily manipulated with one hand, leaving the other hand of the operator free for adjusting the links of the chains to engage the same with the hooks. The hooks, which are located at the outer ends of the laterally-disposed arms 11, extend rearward from the said arms, and there is no liability of the arms becoming accidentally disengaged from the chains during the operation of stretching a fence-wire.

It will be seen that the wire-stretcher is exceedingly simple and inexpensive in construction, that it possesses great strength and durability, and that it is adapted to be readily operated for stretching a fence-wire. It will also be apparent that the wire-engaging device is capable of securely clamping a fence-wire and that the operating-lever is adapted to straddle fence-posts of different shapes and may be readily oscillated thereon to successively stretch and slacken the side chains of the device to enable such chains to be alternately shortened link by link until the fence-wire is stretched to the necessary tension. Furthermore, it will be clear that the tension of the fence-wire operates to hold the operating-lever in engagement with the fence-post and that the device will retain the fence-wire in its stretched condition until such fence-wire has been stapled or otherwise secured to a fence-post.

Instead of making the prongs or sides of the fork or bifurcation straight, as illustrated in Fig. 1 of the accompanying drawings, they may be curved, as shown in Fig. 4. The curved prongs or sides 10$^a$ are adapted to be arranged on a post similar to the lever shown in Fig. 1.

What I claim is—

A wire-stretcher comprising a lever provided at one end with a fork adapted to receive a fence-post to fulcrum the lever thereon, said lever being provided with a pair of rigid laterally-extending arms terminating in hooks, and a wire-engaging device provided with a pair of chains designed to be located at opposite sides of a post and engaged by the hooks of said arms, substantially as described.

In testimony that I claim the foregoing as my own I have hereto affixed my signature in the presence of two witnesses.

ISAAC M. WARNER.

Witnesses:
  CHAS. E. DAY,
  MARVIN J. ROWLEY.